US006722507B2

(12) United States Patent
Cline

(10) Patent No.: US 6,722,507 B2
(45) Date of Patent: Apr. 20, 2004

(54) VALVE FOR FLUID FILTER

(75) Inventor: Steven Cline, Fayetteville, NC (US)

(73) Assignee: Arvin Technologies, Inc., Troy, MI (US)

(*) Notice: Subject to any disclaimer, the term of this patent is extended or adjusted under 35 U.S.C. 154(b) by 119 days.

(21) Appl. No.: 10/102,027

(22) Filed: Mar. 20, 2002

(65) Prior Publication Data

US 2003/0178362 A1 Sep. 25, 2003

(51) Int. Cl.[7] .............................................. B01D 35/14
(52) U.S. Cl. ........................ 210/418; 137/540; 210/97; 210/136; 210/435
(58) Field of Search ........................... 210/97, 110, 136, 210/419, 429, 435, 443, 109, 116, 117, 130, 418, 420; 137/535, 540, 543.17

(56) References Cited

U.S. PATENT DOCUMENTS

| 2,439,936 A | * | 4/1948 | Kasten | 210/130 |
|---|---|---|---|---|
| 2,670,922 A | * | 3/1954 | Carlisle et al. | 137/540 |
| 3,456,800 A | * | 7/1969 | Humbert | 210/130 |
| 4,497,706 A | | 2/1985 | Pickett et al. | 210/130 |
| 4,764,275 A | | 8/1988 | Robichaud | 210/232 |
| 4,820,409 A | | 4/1989 | Lowsky et al. | 210/130 |
| 5,637,215 A | | 6/1997 | Albers, Jr. | 210/305 |
| 5,783,076 A | | 7/1998 | Albers, Jr. | 210/305 |
| 6,217,755 B1 | * | 4/2001 | Stifelman et al. | 210/116 |

* cited by examiner

Primary Examiner—Joseph Drodge
(74) Attorney, Agent, or Firm—Barnes & Thornburg

(57) ABSTRACT

A fluid filter assembly includes a valve assembly having a plunger with openings defined therein. The plunger includes a sealing portion and a non-sealing portion. The sealing portion sealingly engages a valve seat, while the non-sealing portion includes an opening which leads to a central passage through the plunger, the opening and central passage cooperating to direct the flow of fluid through the plunger and an associated spring.

9 Claims, 5 Drawing Sheets

VALVE FOR FLUID FILTER

BACKGROUND

The present invention relates to filters for filtering fluids in a work apparatus such as an internal combustion engine, and more particularly to a valve for use with an inlet, outlet, or relief channel of a filter.

Certain fluid filter assemblies such as oil filter assemblies include a replaceable filter element that is housed within a housing that is secured to an internal combustion engine. Typically, a bottom portion of the housing is secured to, or integral with, the engine block. A top portion of the housing, or filter cap, is detachable from the bottom portion of the housing to allow the filter element to be replaced when it has met its useful service life.

One or more valves may be used to control the flow or advancement of fluid through the oil filter. Such valves typically include a plunger positioned within a channel, and a spring for biasing the plunger toward a valve seat in the channel.

SUMMARY

In accordance with one aspect of the present disclosure, a fluid filter assembly comprises a housing having an internal chamber, a fluid filter positioned in the chamber, a channel in fluid communication with the chamber, and a valve fluidly interposed between the chamber and the channel. The valve includes a valve seat and a plunger movable into engagement with the valve seat. The plunger has an inlet aperture, an outlet aperture, and a connecting central passage defined therethrough. The plunger is configured to permit the advancement of fluid through the inlet aperture and central passage and out the outlet aperture when the plunger is spaced apart from the valve seat.

A method of advancing a fluid through a valve having a plunger is also disclosed herein. The method includes the steps of moving the plunger so as to space the plunger from a valve seat, advancing fluid through the space formed between the plunger and the valve seat, advancing fluid through an opening formed in the plunger, and advancing fluid through and out of a central passage in the plunger.

The above and other features of the present disclosure will become apparent from the following description and the attached drawings.

BRIEF DESCRIPTION OF THE DRAWINGS

The detailed description particularly refers to the accompanying figures in which.

DETAILED DESCRIPTION OF THE DRAWINGS

A fluid filter assembly includes a valve assembly having a plunger with openings defined therein. The plunger includes a sealing portion and a non-sealing portion. The sealing portion sealingly engages a valve seat, while the non-sealing portion includes an opening which leads to a central passage through the plunger, the opening and central passage cooperating to direct the flow of fluid through the plunger and an associated spring.

Figure 1:
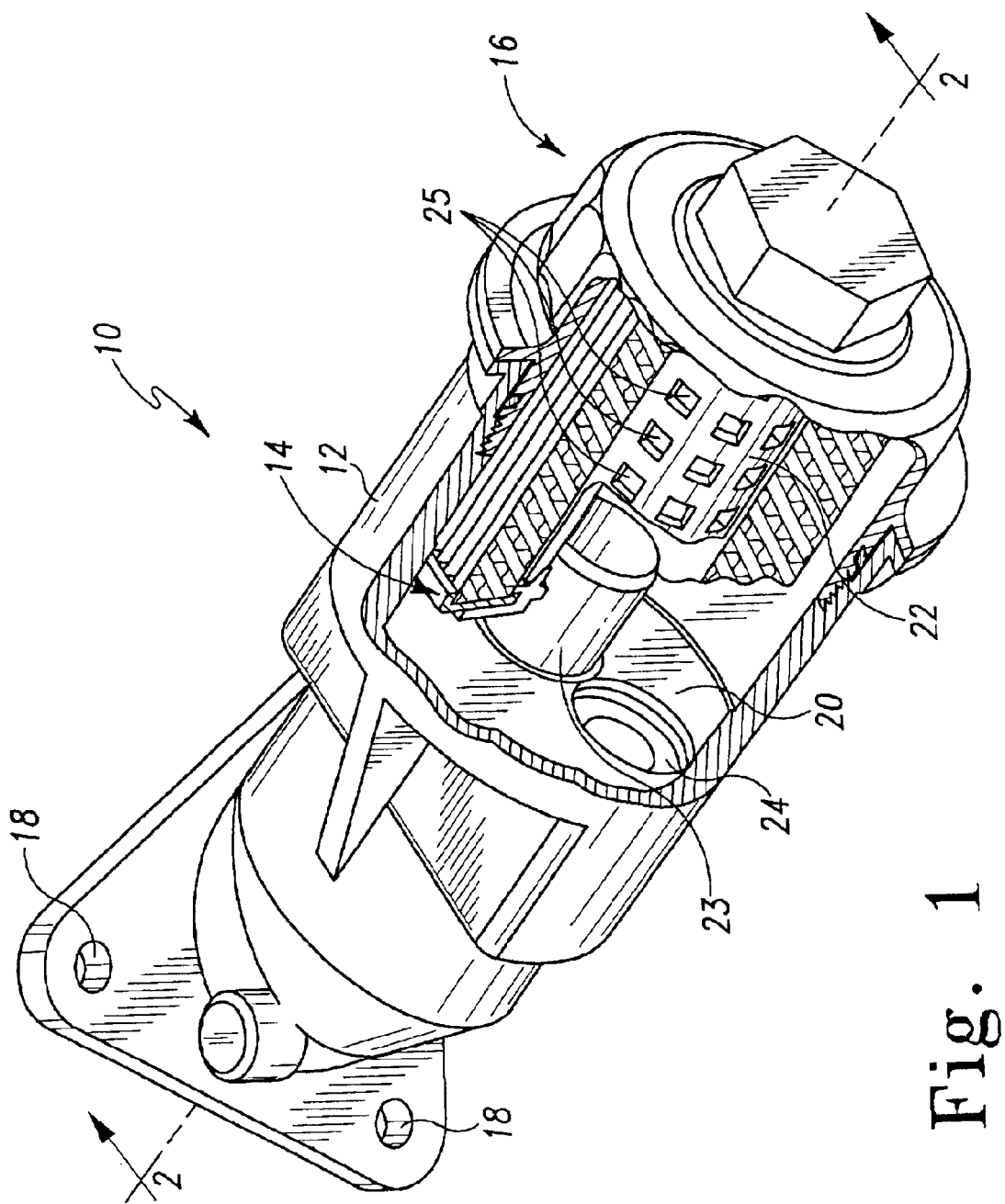
FIG. 1 is a perspective cut-away view of a fluid filter assembly.

Referring now to FIG. 1, there is shown an exemplary embodiment of such a fluid filter assembly. In such an exemplary embodiment, the fluid filter assembly is embodied as an oil filter assembly 10. The oil filter assembly 10 includes a housing 12, an oil filter element 14, and a filter cap 16. A number of lag bolts (not shown) are used to secure the oil filter assembly 10 via apertures 18 to an engine block (not shown).

In the illustrative embodiment described herein, filter cap 16 mates with housing 12 so as to define a filter chamber 20 therewithin. Prior to mating filter cap 16 with housing 12, filter element 14 is sealingly inserted over a center tube 22, as shown in FIG. 1.

During operation of the engine, oil is introduced to filter chamber 20 through inlet port 24 and advanced through filter element 14 in a direction toward center tube 22, thereby removing contaminants and other impurities from the oil. Thereafter, oil is advanced through a number of openings 25 in the center tube 22, and through the outlet 23. It is also within the scope of the present disclosure to provide a filter having a consolidated tube 22 and filter element 14.

Figure 2:
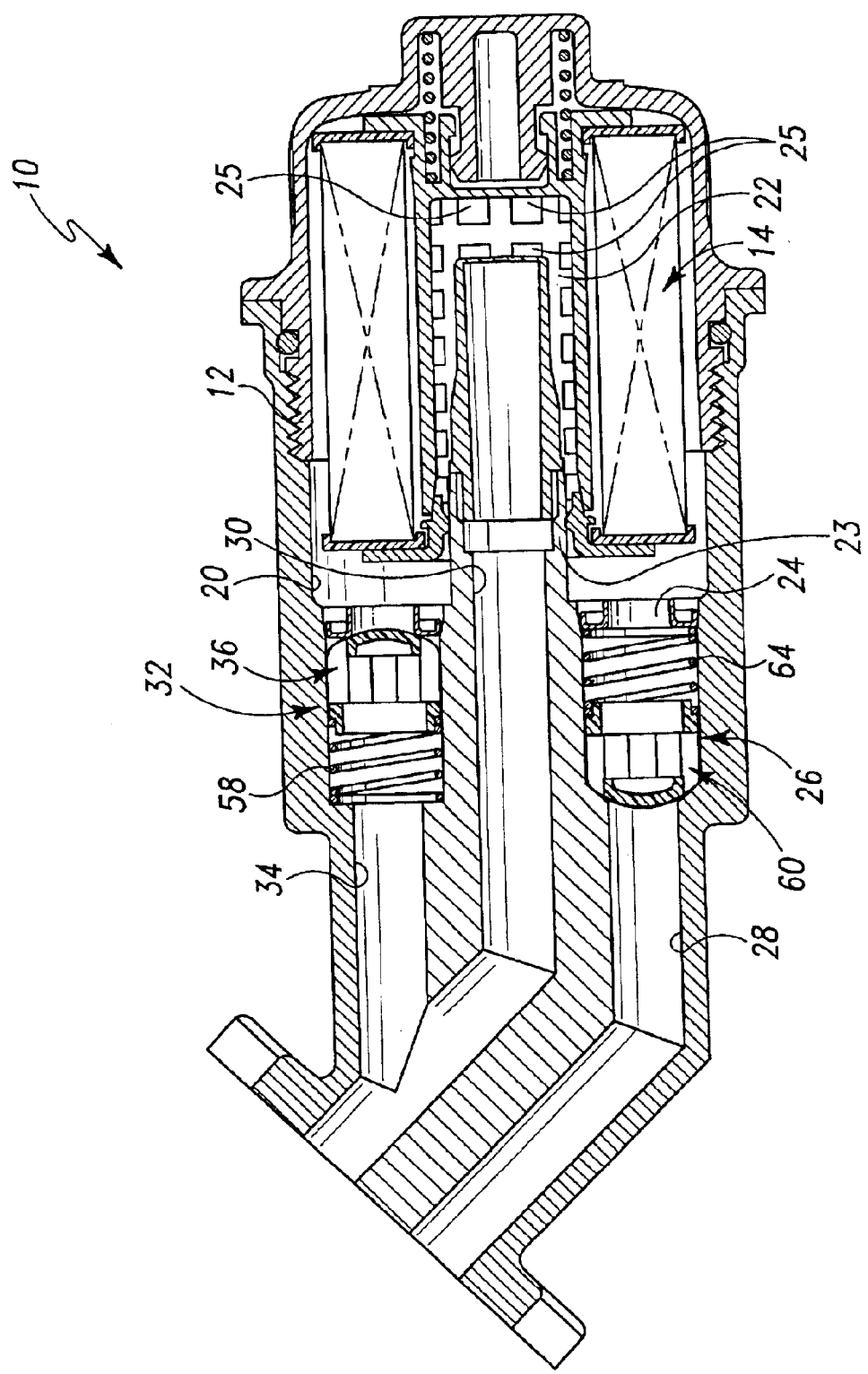
FIG. 2 is a side cross-sectional view of the filter assembly taken along the line 2—2 of FIG. 1, as viewed in the direction of the arrows, showing a valve positioned in the intake channel and a second valve positioned in the relief channel.

As can be seen in the disclosed embodiment shown in FIG. 2, an inlet valve assembly 26 is positioned in inlet chamber 28 leading to inlet port 24. Outlet chamber 30, which leads toward the engine block and away from center tube 22, does not include a valve assembly in the illustrative embodiment. A relief valve assembly 32 is positioned in a relief valve chamber 34 of the illustrative embodiment. Each of the illustrative inlet valve assembly 26 and relief valve assembly 32 is constructed according to the description found herein. However, it is within the scope of the disclosure to use only one valve assembly, or to use any combination of the below-described valves in the inlet, outlet, and relief chambers 28, 30, and 34.

The illustrative oil filter assembly 10 functions in substantially the following manner. Oil flows into oil filter assembly 10 through inlet chamber 28. In the illustrative embodiment, inlet valve assembly 26 is biased toward the closed position shown in FIGS. 2 and 3, and moves to an open position shown in FIG. 4 under hydraulic pressure from the oil. Upon entering housing 12, oil fills filter chamber 20 and is advanced through oil filter element 14 toward center tube 22.

As contaminants and other impurities are removed from the oil by filter element 14, filter element 14 becomes increasingly impermeable. As a result, fluid pressure builds up within filter chamber 20. Relief valve assembly 32 is provided in order to accommodate such build-up of fluid pressure. As filter element 14 approaches impermeability, fluid pressure within filter chamber 20 overcomes the bias of relief valve assembly 32, thereby moving relief plunger 36 into an open position (as shown in FIG. 4) and permitting passage of oil through relief valve chamber 34, effectively bypassing filter element 14.

Figure 5:
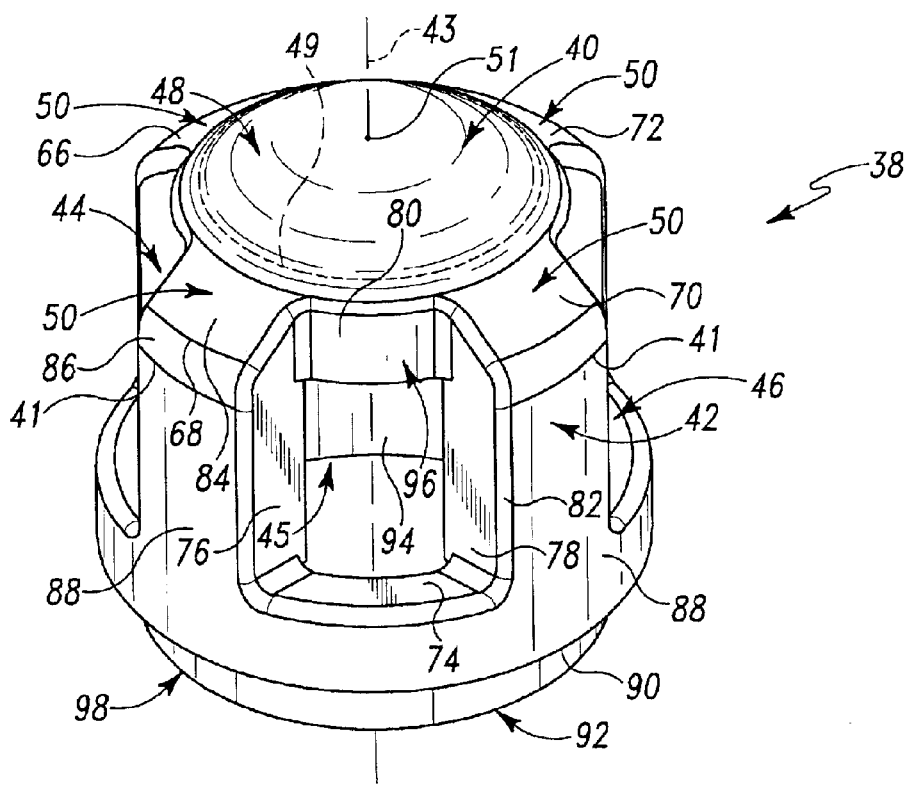
FIG. 5 is a perspective view of an embodiment of the valve plunger of the valves of FIGS. 2–4, showing a plurality of openings formed in the cylindrical body wall and top portion of the plunger.
Figure 6:
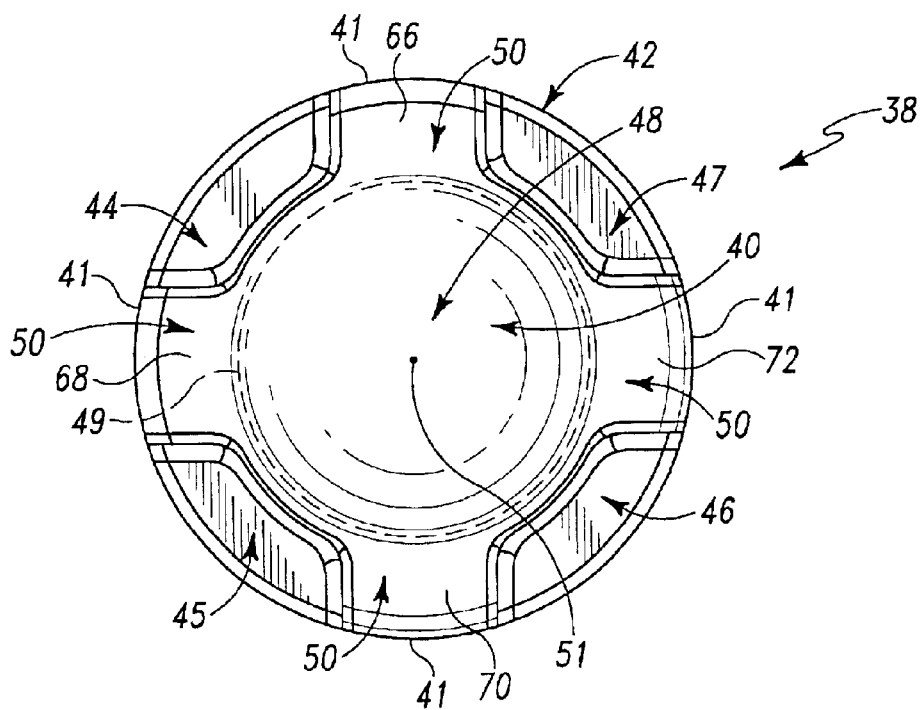
FIG. 6 is a top view of the plunger of FIG. 5, and also showing a top view of the openings that extend up the cylindrical body wall and into the top portion of the plunger.

As shown in FIGS. 5 and 6, a valve assembly according to the disclosure illustratively includes a plunger 38 that is configured to have a head portion 40 and a hollow cylindrical body portion 42. Head portion 40 and body portion 42 are illustratively formed as a single piece; however, it is within the scope of the disclosure to join a head portion and a body portion to form plunger 38. For purposes of discussion below, head portion 40 is defined to extend radially outwardly to rim 41, and body portion 42 connects thereto.

Figure 3:
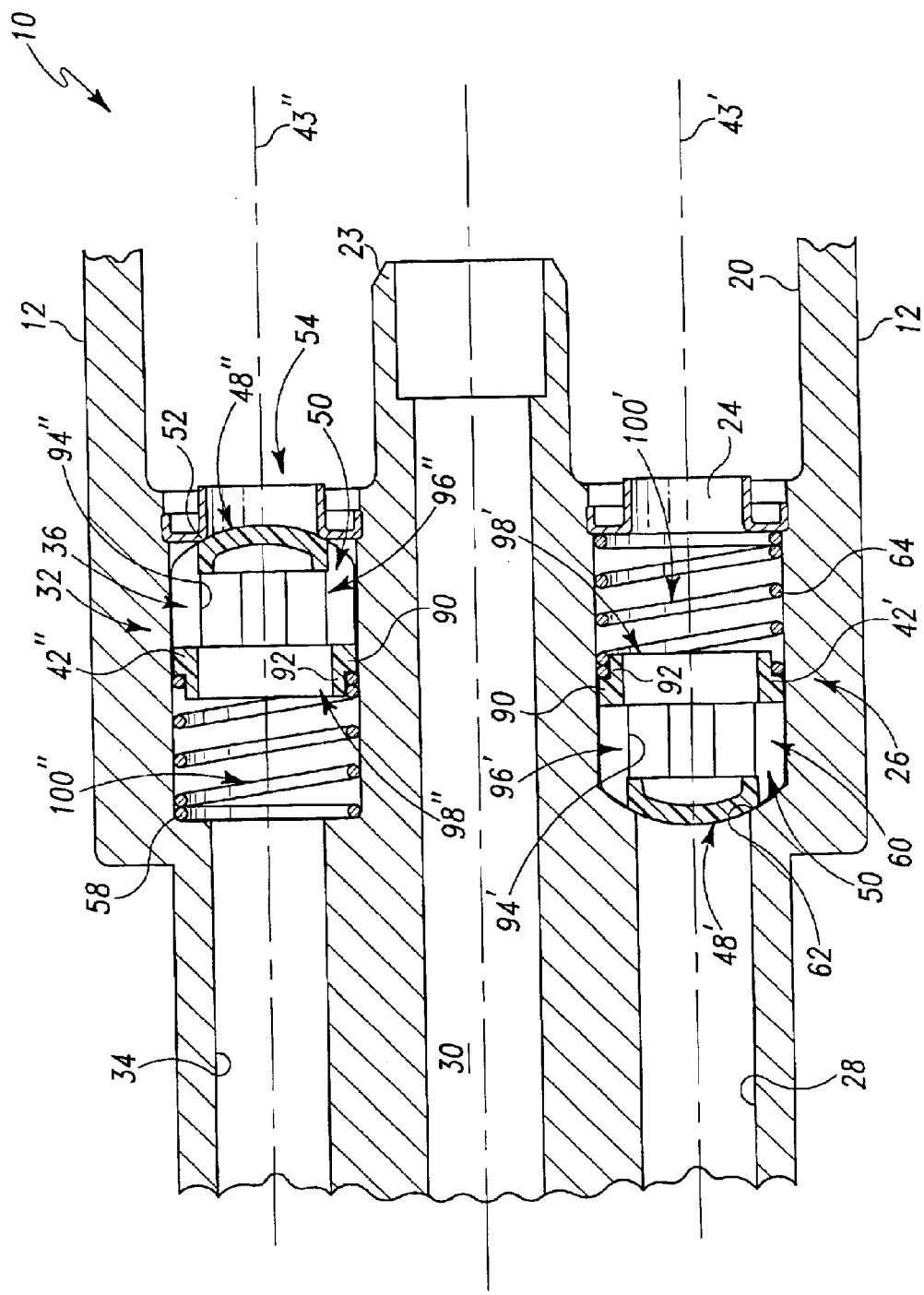
FIG. 3 is an enlarged, fragmentary cross-sectional view similar to FIG. 2, note that the valves are shown positioned in their respective closed positions.
Figure 4:
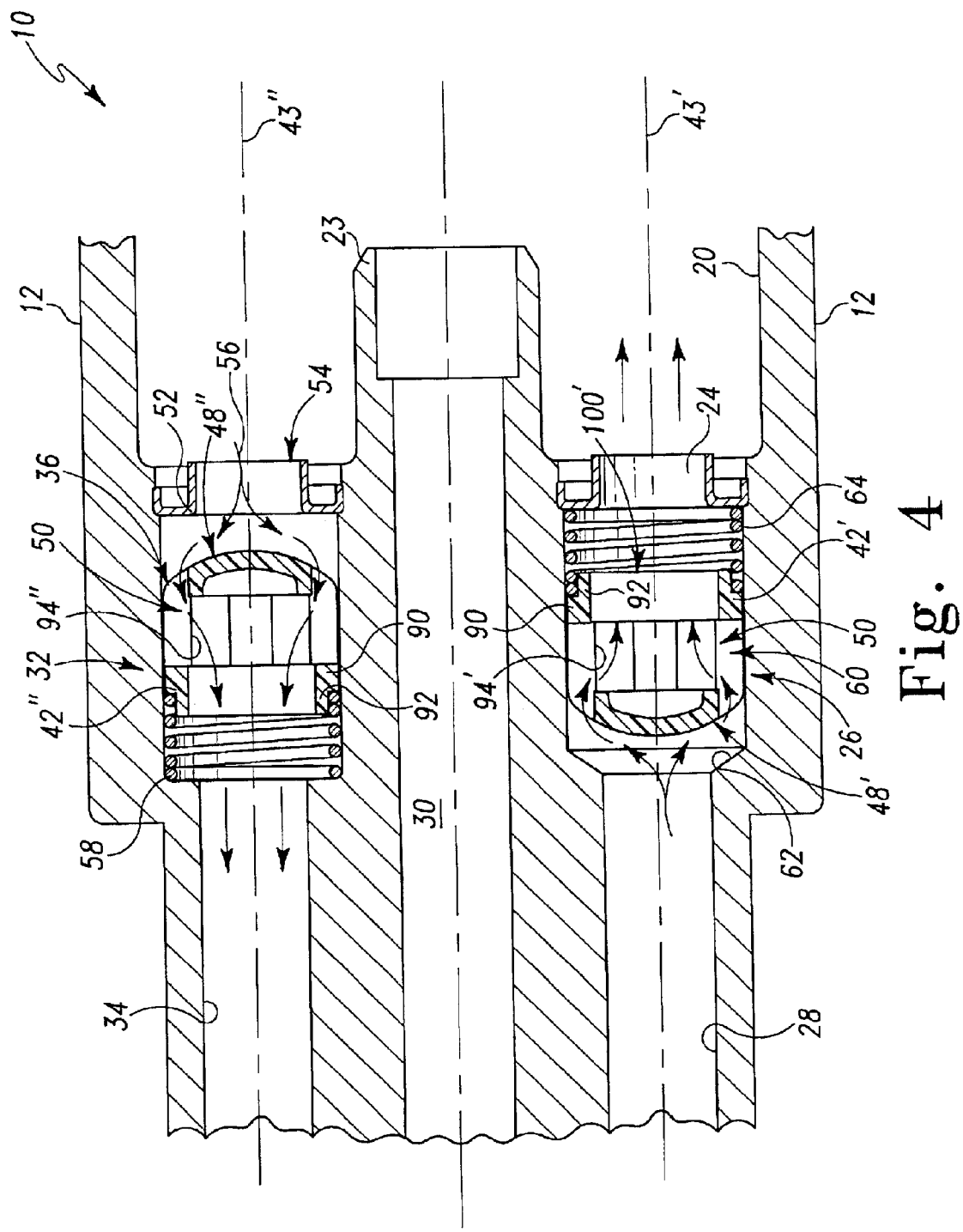
FIG. 4 is a cross-sectional view similar to FIG. 3, but showing the valves positioned in their respective opened positions.

Plunger 38 is positioned in either of inlet chamber 28 or relief valve chamber 34 such that plunger 38 is movable along center axes 43', 43", respectively (see FIGS. 3 and 4). When positioned in either of chambers 28, 34, plunger 38 is configured to move into and out of contact with respective valve seats 52, 62. Head portion 40 contacts valve seats 52, 62 along imaginary line 49, as can be seen in FIGS. 5 and 6. As defined herein, head portion includes a sealing portion 48 and a non-sealing portion 50, which are conceptually separated by imaginary line 49. Illustratively, imaginary line 49 forms a circle having a center 51, through which center axis 43 (shown in FIG. 5) passes.

Plunger 38 includes apertures or openings 44, 45, 46, 47 that extend through both body portion 42 and the non-sealing portion 50 of head portion 40, as can be seen in FIG. 5. A portion of each of openings 44, 45, 46, 47 is exposed through the non-sealing portion 50, providing a top profile as shown in FIG. 6. It should be understood that while four openings 44, 45, 46, 47 are disclosed in the illustrated embodiment, any number of openings is possible, and likewise contemplated by the present disclosure.

As can be seen in FIGS. 5 and 6, plunger 38 illustratively includes shoulders 66, 68, 70, 72 separating openings 44, 45, 46, 47. As can be seen in FIG. 5, openings 44, 45, 46, 47 are illustratively formed in plunger 38 such that each of openings 44, 45, 46, 47 are bounded by a bottom wall 74, side walls 76, 78, and top wall 80. Tapered surface 82 also borders bottom wall 74, side walls 76, 78, and top wall 80, thereby providing for enhanced fluid flow around the edges surrounding openings 44, 45, 46, 47.

Shoulders 66, 68, 70, 72 extend substantially radially from axis 43, and include a contoured top surface 84 (which also makes up non-sealing portion 50 of head portion 40), beveled corner 86, and body wall 88. Body wall 88 is cylindrically formed around and between openings 44, 45, 46, 47 for sliding movement relative to the chamber in which plunger head portion 40 is to be positioned. Plunger 38 forms a central passage 94 within, the central passage 94 extending from a first end 96 to a second end 98 of cylindrical body 42.

Plunger 38 is configured to accommodate a biasing element, such as a coiled spring 58 (or coiled spring 64), which engages a lip 90 formed in the second end 98 of body portion 42, as can be seen in FIGS. 3–5. Spring 58 is configured to exert an axial bias against lip 90 of cylindrical body portion 42. Rim 92 is also substantially cylindrical and extends axially from the second end 98 of body portion 42 for supporting engagement of spring 58 with body portion 42. Spring 58 also defines a central axis and a central passage.

The above-described plunger 38 is shown in both an inlet chamber and an outlet chamber in FIGS. 3 and 4. In FIG. 3, relief plunger 36 contacts relief valve seat 52 such that sealing portion 48" prevents the passage of oil through relief valve chamber 34 until relief plunger 36 is moved into a spaced apart relationship with relief valve seat 52, as shown in FIG. 4.

When increased oil pressure in filter chamber 20 causes relief valve assembly 32 to be moved into the open position shown in FIG. 4, oil from filter chamber 20 is permitted to flow in a direction shown by arrows 56. Oil first flows axially (along axis 43") through relief port 54 and radially outwardly between relief valve seat 52 and relief plunger 36. Upon flowing past sealing portion 48" of relief plunger 36, oil flows axially through openings 44, 45, 46, 47 and then radially inside and axially through a central passage 94" in hollow cylindrical body portion 42" of relief valve assembly 32. Central passage 94" extends from first end 96" to second end 98" of cylindrical body 42". The axial flow of oil continues through central passage 100" formed within spring 58.

Relief valve assembly 32 remains in the open position shown in FIG. 4 as long as the pressure from oil flowing out of filter chamber 20 exceeds the bias of spring 58. The present disclosure contemplates the substitution of any biasing element known in the art, however, and is not limited to a spring 58 being used in relief valve assembly 32.

Inlet valve assembly 26, and likewise any other valve assembly contemplated for use with a filter assembly, is similarly constructed according to the description above for the relief valve assembly 32. As illustratively shown in FIGS. 3 and 4, inlet valve assembly 26 includes inlet plunger 60, inlet valve seat 62, and spring 64. Note that inlet valve seat 62 is formed by inlet chamber 28 and is not a separate element, as is the case with relief valve seat 52. Nonetheless, inlet valve seat 62 functions similarly to that of relief valve seat 52. In FIG. 3, inlet plunger 60 contacts inlet valve seat 62 such that sealing portion 48' prevents the passage of oil through inlet valve chamber 28 until inlet plunger 60 is moved into a spaced apart relationship with inlet valve seat 62, as shown in FIG. 4.

When an oil pressure differential causes inlet valve assembly 26 to be moved into the open position shown in FIG. 4, oil is permitted to flow through inlet chamber 28 toward filter chamber 20. Oil first flows axially (along axis 43') past inlet valve seat 62 and then radially outwardly between inlet valve seat 62 and inlet plunger 60. Upon flowing past sealing portion 48' of inlet plunger 60, oil flows axially through openings 44, 45, 46, 47 and then radially inside and axially through central passage 94' of hollow cylindrical body portion 42' of inlet valve assembly 26. Central passage 94' extends from first end 96' to second end 98' of cylindrical body 42'. The axial flow of oil continues through central passage 100' formed within spring 64.

Inlet valve assembly 26 remains in the open position shown in FIG. 4 as long as the pressure from oil flowing through inlet chamber 28 exceeds the bias of spring 64.

As described herein, the valve assemblies have a number of desirable features. For example, non-laminar fluid flow around the sealing portion of the plunger is substantially reduced by providing openings in the non-sealing portion of the plunger. Such openings allow for the advancement of fluid in a substantially axial direction through the plunger rather than directing the flow around the outer periphery plunger. In such a manner, fluid flows substantially axially through the valve assembly and associated valve chamber.

Furthermore, the flow of fluid (e.g., as shown in FIG. 4) flows in a relatively uninterrupted manner due to not having to pass between adjacent coils of the plunger spring. In particular, since the flow of fluid does not pass between the coils of the plunger spring, the plunger spring need not be constructed of a material having a particular material strength (e.g., a particular spring constant range) that prevents the spring from being completely compressed when the valve assembly is positioned in its open position. Specifically, if fluid were required to flow between adjacent coils of the plunger spring, a situation in which the spring is completely compressed would hinder the flow of fluid. However, the configuration of the valve assemblies described herein avoids this result since the flow of oil is unaffected by the degree of compression of the plunger spring. As such, the construction parameters for the plunger spring are relatively nonrestrictive thereby yielding lower manufacturing costs for the plunger spring.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There are a plurality of advantages of the present disclosure arising from the various features of the filter assembly and associated method described herein. It will be noted that alternative embodiments of the filter assembly and associated method of the present disclosure may not include all of the features described yet still benefit from at least some of the advantages of such features. Those of ordinary skill in the art may readily devise their own implementations of a filter assembly and associated method that incorporate one or more of the features of the present invention and fall within the spirit and scope of the present disclosure as defined by the appended claims.

What is claimed is:

1. A fluid filter assembly comprising
    a housing having a filter chamber, an inlet chamber configured to admit fluid into the filter chamber, an outlet chamber configured to discharge fluid from the filter chamber, and a relief chamber,
    a fluid filter positioned in the filter chamber to filter fluid flowing from the inlet chamber to the outlet chamber, the relief chamber being configured to discharge fluid from the filter chamber for bypass of the fluid filter, and
    a valve positioned in the inlet chamber, the valve comprising
        a valve seat, and
        a plunger movable into engagement with the valve seat, the plunger having an inlet aperture, an outlet aperture, and a connecting central passage defined therethrough,
    wherein the plunger is configured to permit the advancement of fluid through the inlet aperture and central passage and out the outlet aperture to the filter chamber when the plunger is spaced apart from the valve seat mid to block the advancement of fluid trough the inlet aperture and central passage and out the outlet aperture when the plunger engages the valve seat.

2. The filter assembly of claim 1, wherein the plunger comprises a cylindrical body having a first end and a second end and a head joined to the cylindrical body at the first end, the cylindrical body being formed to include the central passage therein and the outlet aperture at the second end.

3. The filter assembly of claim 2, further comprising a spring configured to engage the plunger, the spring being positioned to exert a bias against the second end of the cylindrical body.

4. The filter assembly of claim 3, wherein the spring is configured to have a longitudinal central passage defined therein, and fluid advances substantially longitudinally through the central passage of the spring.

5. The filter assembly of claim 3, wherein the spring includes coils that have an outer perimeter, and the outer perimeter of the coils contacts the inlet chamber.

6. The filter assembly of claim 2, wherein the cylindrical body has a central axis extending between the first end and the second end, and fluid advances through the cylindrical body substantially axially.

7. A fluid filter assembly comprising
    a housing having a filter chamber, an inlet chamber configured to admit fluid into the filter chamber, and an outlet chamber configured to discharge fluid from the filter chamber,
    a fluid filter positioned in the filter chamber to filter fluid flowing from the inlet chamber to the outlet chamber, and
    an inlet valve positioned in the inlet chamber, the inlet valve comprising
        a valve seat, and
        a plunger movable into engagement with the valve seat, the plunger having an inlet aperture, an outlet aperture, and a connecting central passage defined therethrough,
    wherein the plunger is configured to permit the advancement of fluid through the inlet aperture and central passage and out the outlet aperture to the filter chamber when the plunger is spaced apart from the valve seat.

8. The filter assembly of claim 7, further comprising a spring engaging the plunger, wherein the spring is configured to have a longitudinal central passage defined therein for advancement of fluid substantially longitudinally through the central passage of the spring, and the spring includes coils that have an outer perimeter contacting the inlet chamber.

9. The filter assembly of claim 7, further comprising (i) an inlet port secured to the inlet chamber and (ii) a spring engaging the plunger and the inlet port.

* * * * *